United States Patent
Van Willigenburg

(10) Patent No.: US 10,703,985 B2
(45) Date of Patent: Jul. 7, 2020

(54) PROCESS FOR CRACKING HYDROCARBON STREAM USING FLUE GAS FROM GAS TURBINE

(71) Applicant: Sabic Global Technologies B.V., Bergen op Zoom (NL)

(72) Inventor: Joris Van Willigenburg, Geleen (NL)

(73) Assignee: Sabic Global Technologies B.V., Bergen op Zoom (NL)

( * ) Notice: Subject to any disclaimer, the term of this patent is extended or adjusted under 35 U.S.C. 154(b) by 17 days.

(21) Appl. No.: 16/318,339

(22) PCT Filed: Jul. 24, 2017

(86) PCT No.: PCT/IB2017/054476
§ 371 (c)(1),
(2) Date: Jan. 16, 2019

(87) PCT Pub. No.: WO2018/020399
PCT Pub. Date: Feb. 1, 2018

(65) Prior Publication Data
US 2019/0284484 A1 Sep. 19, 2019

(30) Foreign Application Priority Data
Jul. 25, 2016 (EP) .................................... 16180943

(51) Int. Cl.
*C10G 9/36* (2006.01)
*F02C 6/18* (2006.01)
(Continued)

(52) U.S. Cl.
CPC ................ *C10G 9/36* (2013.01); *C10G 11/00* (2013.01); *F02C 3/00* (2013.01); *F02C 6/18* (2013.01); *C10G 2400/20* (2013.01); *F02C 3/04* (2013.01)

(58) Field of Classification Search
CPC ...... C10G 9/36; C10G 11/00; C10G 2400/20; F02C 3/00; F02C 6/18; F02C 3/04
See application file for complete search history.

(56) References Cited

U.S. PATENT DOCUMENTS 4,912,282 A * 3/1990 Klaus ....................... C10G 9/14
208/106
2005/0268594 A1 12/2005 Kurihara et al.
2006/0080970 A1 4/2006 Ahmed et al.

FOREIGN PATENT DOCUMENTS

| AU | 2015310878 | 3/1917 |
|---|---|---|
| WO | WO 2016/034647 | 3/1916 |
| WO | WO 2015/128035 | 9/2015 |

OTHER PUBLICATIONS

Office Action issued in corresponding Singaporean Patent Application No. 11201900423U, dated Nov. 29, 2019.
(Continued)

*Primary Examiner* — Ali Z Fadhel
(74) *Attorney, Agent, or Firm* — Norton Rose Fulbright US LLP

(57) ABSTRACT

A process for cracking a hydrocarbon stream by: combusting fuel in a gas turbine in the presence of compressed air to produce a flue gas, wherein the flue gas drives a turbine to produce electricity in a coupled generator or work to power a coupled rotating equipment; (a) feeding a first portion of the flue gas to a heat exchanger; (b) feeding ambient air to the heat exchanger to be heated by the first portion of the flue gas to provide heated air; (c) feeding a furnace with fuel and a mixture of a second portion of the flue gas and the heated air obtained by step (c) and (d) cracking the hydrocarbon stream in the furnace.

12 Claims, 11 Drawing Sheets

(51) Int. Cl.
*C10G 11/00* (2006.01)
*F02C 3/00* (2006.01)
*F02C 3/04* (2006.01)

(56) References Cited

OTHER PUBLICATIONS

International Search Report and Written Opinion issued in International Patent Application No. PCT/IB2017/054476, dated Nov. 10, 2017.
Moosavi & Tahery, "Integrating Gas Turbines with Cracking Heaters in Ethylene Plants" *International Journal of Engineering Research & Technology*, 214, 3(6):820-825.
Search Report issued in European Patent Application No. 16180943. 9, dated Jan. 24, 2017.
Zimmerman & Walzl "Ethylene" *Ullmann's Encyclopedia of Industrial Chemistry*, 2012, 13:465-529.

* cited by examiner

PROCESS FOR CRACKING HYDROCARBON STREAM USING FLUE GAS FROM GAS TURBINE

CROSS-REFERENCE TO RELATED APPLICATIONS

This application is a national phase under 35 U.S.C. § 371 of International Application No. PCT/M2017/054476, filed Jul. 24, 2017, which claims the benefit of priority of European Patent Application No. 16180943.9, filed Jul. 25, 2016, the entire contents of each of which are which ia hereby incorporated by reference in their entirety.

FIELD OF THE INVENTION

The present invention relates to a process for cracking a hydrocarbon stream using a flue gas from a gas turbine. In most preferred embodiments the cracking is conducted with a steam cracker.

BACKGROUND OF THE INVENTION

Steam cracking, also referred to as pyrolysis, has long been used to crack various hydrocarbon feedstocks into olefins, preferably light olefins such as ethylene, propylene, and butenes. Conventional steam cracking utilizes a pyrolysis furnace which has two main sections: a convection section and a radiant section. The hydrocarbon feedstock typically enters the convection section of the furnace as a liquid (except for light feedstocks which enter as a vapor) wherein it is typically heated and vaporized by indirect contact with hot flue gas from the radiant section and by direct contact with steam. The vaporized feedstock and steam mixture is then introduced into the radiant section where the cracking takes place. The resulting products, including olefins, leave the pyrolysis furnace for further downstream processing, including quenching.

The use of gas turbines (GT) to produce power while simultaneously utilizing the hot, oxygen rich exhaust gas as combustion air in the cracking furnaces is a very attractive means of reducing energy requirements per unit of ethylene production. Such process is known and is explained e.g. in Integrating Gas Turbines with Cracking Heaters in Ethylene Plants, International Journal of Engineering Research & Technology (IJERT), Vol. 3 Issue 6, June 2014, p. 820-825. The use of turbine exhaust gas (TEG) is an effective means providing high level air preheat lowering the heater's fuel requirement. However, unlike air preheat systems, because of the reduced oxygen content of TEG, the total mass flow of flue gas passing through the furnaces is increased. This results in increased steam production in the convection (heat recovery) section of the pyrolysis module.

WO2015128035 discloses a process for increasing process furnaces energy efficiency through gas turbine integration by using turbine exhaust gas. The exhaust gas is fed to a heat recovery unit. The system of WO2015128035 has a problem that the use of preheated air results in higher flame temperatures and the formation of higher amounts of undesired NOx after combustion in the flue gas.

According to its abstract, US 2006/0080970 describes a method of heating a fluid in a fluid heater integrated with a gas turbine used in connection with a steam methane reformer requiring a catalyst.

There is a demand for a process which is energy efficient and in which the amount of NOx is reduced. There is also a demand for a method for increasing the energy efficiency that saves fuel burned by the furnace rather than increasing the steam production by the furnace.

OBJECTS OF THE INVENTION

It is an object of the invention to provide a process for cracking a hydrocarbon stream using a flue gas from a gas turbine which is energy efficient and in which the amount of NOx is reduced. It is also an object of the invention to provide a method for increasing the energy efficiency that saves fuel burned by the furnace of a steam cracker unit, rather than increasing the steam production by the furnace.

SUMMARY OF THE INVENTION

Accordingly, the present invention provides a process for cracking a hydrocarbon stream, said process including the steps of combusting fuel in a gas turbine in the presence of compressed air to produce a flue gas, wherein the flue gas drives a turbine to produce electricity in a coupled generator or work to power a coupled rotating equipment; feeding a first portion of the flue gas to a heat exchanger; feeding ambient air to the heat exchanger to be heated by the first portion of the flue gas to provide heated air; feeding a furnace with fuel and a mixture of a second portion of the flue gas and the heated air obtained by step (c) and cracking the hydrocarbon stream in the furnace of a steam cracking unit.

The present invention also provides a system for cracking a hydrocarbon stream, said system comprising: a gas turbine for combusting fuel in the presence of compressed air to produce a flue gas, wherein the flue gas drives a turbine to produce electricity in a coupled generator or work to power a coupled rotating equipment, a heat exchanger for being fed with a first portion of the flue gas and with ambient air, wherein the ambient air is heated by the first portion of the flue gas to provide heated air and a furnace of a steam cracking unit for cracking the hydrocarbon stream, wherein the furnace is fed with fuel and a mixture of a second portion of the flue gas and the heated air. The furnace is preferably part of a steam cracking unit (steam cracker).

According to the process and the system of the invention, the flue gas produced by the gas turbine (gas turbine exhaust) is split into a first portion which is used for heating ambient air to be fed to the furnace of the steam cracking unit and a second portion which is fed to the furnace. Thus, the combustion air to be fed to the furnace of the steam cracking unit is a mixture of the second portion of the flue gas and the air heated by the first portion of the flue gas.

The flue gas has a lower oxygen content than ambient air. Hence, if the combustion air fed to the furnace consists of the flue gas, the flame temperature in the furnace would be low. If the combustion air fed to the furnace consists of air, the flame temperature in the furnace would be high. Also, a higher temperature of the combustion air fed to the furnace results in a higher flame temperature in the furnace.

The following includes definitions of various terms and phrases used throughout this specification.

The terms "about" or "approximately" are defined as being close to as understood by one of ordinary skill in the art. In one non-limiting embodiment, the terms are defined to be within 10%, preferably, within 5%, more preferably, within 1%, and most preferably, within 0.5%.

The terms "wt. %", "vol. %", or "mol. %" refers to a weight, volume, or molar percentage of a component, respectively, based on the total weight, the total volume, or the total moles of material that includes the component. In a non-limiting example, 10 moles of component in 100 moles of the material is 10 mol. % of component.

The term "effective," as that term is used in the specification and/or claims, means adequate to accomplish a desired, expected, or intended result.

The use of the words "a" or "an" when used in conjunction with the term "comprising" in the claims or the specification may mean "one," but it is also consistent with the meaning of "one or more," "at least one," and "one or more than one."

The words "comprising" (and any form of comprising, such as "comprise" and "comprises"), "having" (and any form of having, such as "have" and "has"), "including" (and any form of including, such as "includes" and "include"), or "containing" (and any form of containing, such as "contains" and "contain") are inclusive or open-ended and do not exclude additional, unrecited elements or method steps.

The process of the present invention can "comprise," "consist essentially of," or "consist of" particular ingredients, components, compositions, steps etc., disclosed throughout the specification. It is also to be understood that a description on a product/composition/process/system comprising certain components also discloses a product/composition/system consisting of these components. The product/composition/process/system consisting of these components may be advantageous e.g., in that it offers a simpler, more economical process for the preparation of the product/composition. Similarly, it is also to be understood that, for example, a description on a process comprising certain steps also discloses a process consisting of these steps. The process consisting of these steps may be advantageous in that it offers a simpler, more economical process.

When values are mentioned for a lower limit and an upper limit for a parameter, ranges made by the combinations of the values of the lower limit and the values of the upper limit are also understood to be disclosed.

In the context of the present invention, 13 Embodiments are now described. Embodiment 1 is a process for steam cracking a hydrocarbon stream. The process includes the steps of (a) combusting fuel in a gas turbine in the presence of compressed air to produce a flue gas, wherein the flue gas drives a turbine to produce electricity in a coupled generator or work to power a coupled rotating equipment, (b) feeding a first portion of the flue gas to a heat exchanger, (c) feeding ambient air to the heat exchanger to be heated by the first portion of the flue gas to provide heated air, (d) feeding a radiant section of a furnace of a steam cracking unit with fuel and a mixture of a second portion of the flue gas and the heated air obtained by step (c) and (e) feeding a convective portion of the furnace of the steam cracking unit the hydrocarbon feed stream via convection coils in the convection section of the furnace in the furnace steam cracker. Embodiment 2 is the process of Embodiment 1, wherein the hydrocarbon feed to be steam cracked is preheated by the convection section of the furnace, the radiant portion of the furnace, or both. Embodiment 3 is the process of Embodiments 1 or 2, wherein the weight ratio between the first portion and the second portion is 1:99 to 99:1, for example 10:90 to 90:10, 20:80 to 80:20, 30:70 to 70:30 or 40:60 to 60:40. Embodiment 4 is the process of any one of Embodiments 1 to 3, wherein the flue gas obtained in step (a) contains from about 5% to about 18%, from about 10% to about 16%, or from about 13% to about 15% oxygen by volume. Embodiment 5 is the process of any one of Embodiments 1 to 4, wherein the flue gas obtained in step (a) has a temperature from about 300° C. to about 800° C., from about 350° C. to about 700° C., or from about 400° C. to about 650° C. Embodiment 6 is the process of any one of Embodiments 1 to 5, wherein the mixture has a temperature of from about 300° C. to about 800° C., from about 350° C. to about 700° C., or from about 400° C. to about 650° C.

Embodiment 7 is a system for steam cracking a hydrocarbon stream. The system includes (a) a gas turbine for combusting fuel in the presence of compressed air to produce a flue gas, wherein the flue gas drives a turbine to produce electricity in a coupled generator or work to power a coupled rotating equipment; (b) a heat exchanger for being fed with a first portion of the flue gas and with ambient air, wherein the ambient air is heated by the first portion of the flue gas to provide heated air, and (c) a steam cracking unit comprising a furnace for cracking the hydrocarbon stream, wherein the furnace is fed with fuel and a mixture of a second portion of the flue gas and the heated air; and wherein said furnace comprises a radiant section and a convection section. Embodiment 8 is the system of Embodiment wherein the air to be fed to the heat exchanger is increased in pressure before being fed to the heat exchanger. Embodiment 9 is the system of any one of Embodiments 7 to 8, wherein the system further includes a means for increasing the oxygen content of the flue gas or the second portion of the flue gas. Embodiment 10 is the system of any one of Embodiments 7 to 9, wherein the heat exchanger has a further function of at least one of feed preheating, boiler feed water preheating and steam superheating. Embodiment 11 is the system of any one of Embodiments 7 to 10, wherein the system further includes a bypass stack for drawing a part of the flue gas from the gas turbine before splitting the flue gas into the first portion and the second portion. Embodiment 12 is the system according to any one of Embodiments 7 to 11, wherein the system includes a plurality of the furnaces, wherein each of the furnaces is fed with fuel and a mixture of a part of the flue gas from the gas turbine and a part of the heated air from the heat exchanger. Embodiment 13 is the system according to any one of Embodiments 7 to 12, wherein the system includes a plurality of the furnaces and a corresponding number of the heat exchangers, wherein each of the furnaces is fed with fuel and a mixture of a part of the flue gas from the gas turbine and the heated air from the respective heat exchanger.

Other objects, features and advantages of the present invention will become apparent from the following figures, detailed description, and examples. It is noted that the invention relates to all possible combinations of features described herein, preferred in particular are those combinations of features that are present in the claims. It will therefore be appreciated that all combinations of features relating to the composition, process, system according to the invention; all combinations of features relating to the process according to the invention and all combinations of features relating to the system according to the invention and features relating to the process according to the invention are described herein. It should be understood, however, that the figures, detailed description, and examples, while indicating specific embodiments of the invention, are given by way of illustration only and are not meant to be limiting. Additionally, it is contemplated that changes and modifications within the spirit and scope of the invention will become apparent to those skilled in the art from this detailed description. In further embodiments, features from specific embodiments may be combined with features from other embodiments. For example, features from one embodiment may be combined with features from any of the other embodiments. In further embodiments, additional features may be added to the specific embodiments described herein.

BRIEF DESCRIPTION OF THE DRAWINGS

Advantages of the present invention may become apparent to those skilled in the art with the benefit of the following detailed description and upon reference to the accompanying drawings.

DETAILED DESCRIPTION

Figure 1:
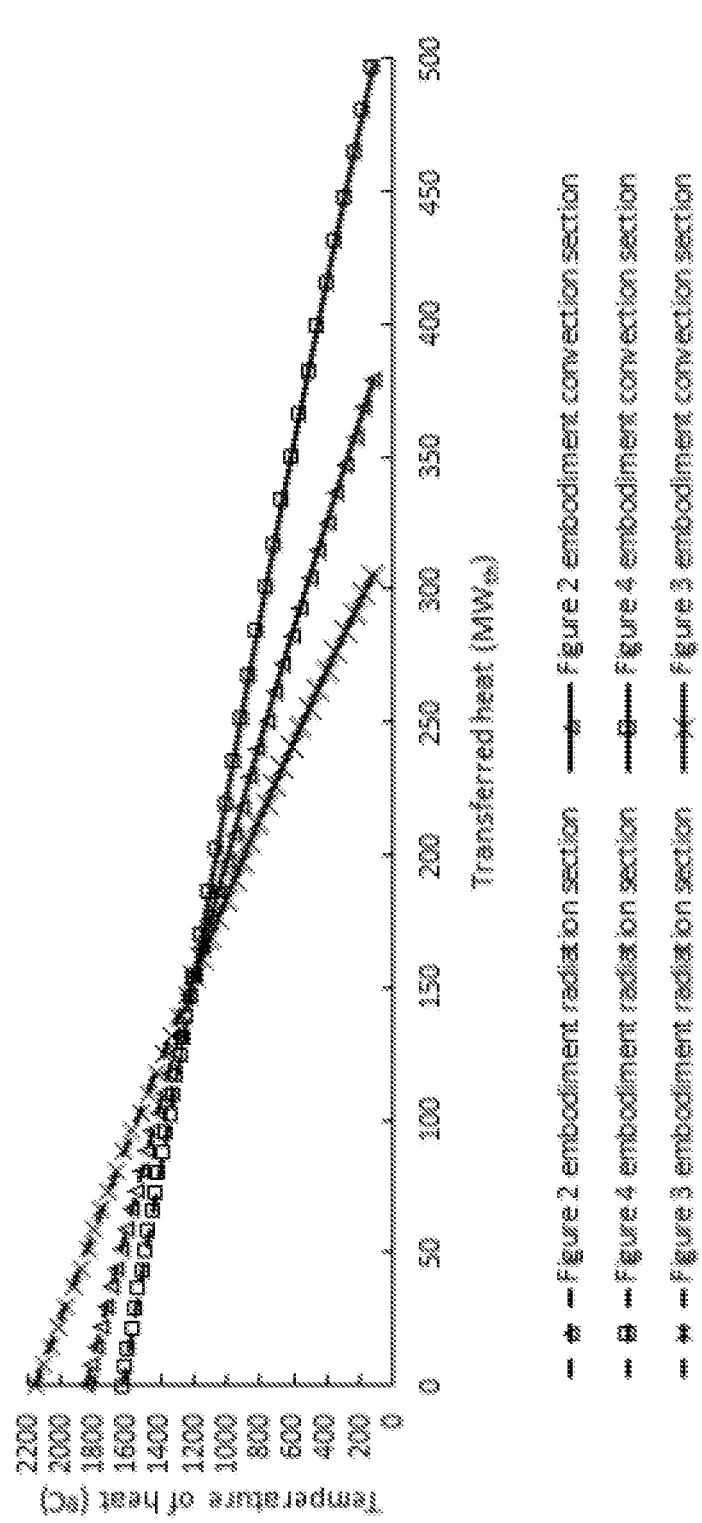
FIG. 1 shows heat release plots of a flue gas in a furnace.

According to the invention, the formation of the combustion air by the mixture of flue gas and the air heated by the flue gas allows control of the temperature and the oxygen content of the combustion air to be fed to the furnace. This in turn controls the flame temperature in the furnace. This advantageously allows optimizing the fuel consumption while limiting the formation of NOx to an acceptable level.

Another important advantage is that the invention allows control of the flue gas flow to the convection section independent of the cracking condition or heat added to the combustion air prior to combustion in the furnace. The invention enables to change the cracking conditions and/or combustion air preheating without change to the heat transfer in the convection section and vice versa, to change the heat transfer in the convection section without affecting the cracking conditions. One particular advantage is that combustion air preheating by means of hot gas turbine exhaust can be applied without a change in steam production by the furnace. This is an advantage when more steam is not desired.

The weight ratio between the first portion and the second portion may be within any range, e.g. 1:99 to 99:1, for example 10:90 to 90:10, 20:80 to 80:20, 30:70 to 70:30 or 40:60 to 60:40.

The fuel can be a suitable fuel for a combustion reaction in the presence of air, for example, the fuel can be a hydrocarbon mixture such as petroleum, gasoline, diesel, natural gas or a fuel gas, which can be produced as a byproduct from an ethylene plant. For example, the fuel gas can contain hydrogen and methane. In certain embodiments, the fuel gas can be syngas, which contains carbon monoxide and hydrogen. The syngas can be produced by the gasification of coal or petroleum products.

The flue gas obtained by the gas turbine may include oxygen, carbon dioxide, steam, and uncombusted fuel. For example, the flue gas can contain from about 5% to about 18%, from about 10% to about 16%, or from about 13% to about 15% oxygen by volume.

The flue gas obtained by the gas turbine may have a temperature from about 300° C. to about 800° C., from about 350° C. to about 700° C., or from about 400° C. to about 650° C. In certain embodiments, the temperature of the flue gas can be increased, e.g., using a duct burner. For example, the temperature of the flue gas can be increased to about 850° C.

In the heat exchanger, heat is transferred from the first portion of the flue gas to the air. The heated air obtained by the heat exchanger may have a temperature of 100 to 800° C. The final temperature is dependent on the temperature of the gas turbine exhaust and the heat exchanger design.

The furnace is preferably a furnace for steam cracking. The furnace has a radiant section and a convection section. The fuel and the combustion air enter the radiant section and the fuel is combusted to reach a high temperature for steam cracking. The radiant section of the furnace may have an adiabatic flame temperature of 1600 to 2200° C., for example 1800 to 2000° C.

Feed preheating, boiler feed water preheating and steam superheating are typically performed in the convection section. Reduction of the second portion (herein sometimes referred as bypass flow) of the flue gas results in a higher adiabatic flame temperature, more heat to the radiation section and less heat available for heat recovery in the convection section. Accordingly, in some embodiments, the heat exchanger has, in addition to the function of heating air, a further function of at least one of feed preheating, boiler feed water preheating and steam superheating. This is particularly useful for situations where the ratio of the second portion to the first portion of the flue gas is low.

Preferably, the system comprises a means for controlling the amount of the first portion to be fed to the heat exchanger.

Preferably, the system comprises a means for controlling the amount of the second portion to be mixed with the heated air.

Preferably, the ambient air to be fed to the heat exchanger is increased in pressure before being fed to the heat exchanger. This overcomes the pressure drop created by the heat exchanger. This allows a more compact design of the heat exchanger that causes more pressure drop on the fresh air side. If the pressure drop needs to be low, air velocity needs to be low, which increases the diameter of pipes making it more costly. When some pressure drop is allowed, the gas velocities can be higher and less steel will be required.

The system may further comprise a means for increasing the oxygen content of the flue gas or the second portion of the flue gas.

In some embodiments, the system according to the invention comprises a bypass stack for drawing a part of the flue gas from the gas turbine before splitting the flue gas into the first portion and the second portion. This allows using the gas turbine for electricity or work production at a desired load at times when the steam cracker is out of operation or in operation at reduced load. Such bypass stack includes a valve/air register to control the air flow to the bypass stack.

In some embodiments, the system according to the invention comprises a plurality of the furnaces, wherein each of the furnaces is fed with fuel and a mixture of a part of the flue gas from the gas turbine and a part of the heated air from the heat exchanger. In such embodiments, the flue gas from the gas turbine is split such that each of the furnaces is fed with a part of the flue gas and the heat exchanger is fed with a part of the flue gas. The heated air from the heat exchanger is split such that each of the furnaces is fed with a part of the heated air.

In some embodiments, the system according to the invention comprises a plurality of the furnaces and a corresponding number of the heat exchangers, wherein each of the furnaces is fed with fuel and a mixture of a part of the flue gas from the gas turbine and the heated air from the respective heat exchanger. In such embodiments, the flue gas from the gas turbine is split such that each of the furnaces is fed with a part of the flue gas and each of the heat exchangers is fed with a part of the flue gas. The heated air from the heat exchanger is fed to the respective furnace.

According to an aspect of the invention, the invention provides a process for cracking a hydrocarbon stream in a furnace by the system according to the invention.

The hydrocarbon feedstream can include paraffins, olefins, naphthenes, and/or aromatics. The hydrocarbon feedstock can be light or heavy, i.e., can have a boiling point ranging from about 30° C. to about 500° C. The hydrocarbon feedstock can also be a gas containing ethane, propane and/or butane. The hydrocarbon feedstock can also be a hydrowax from a hydrotreater or a hydrocracker, also referred to as unconverted oil or hydrocracker bottoms. In certain embodiments, the feedstock can be a hydrocarbon stream that is rich in olefins, paraffins, isoparaffins, and/or naphthenes. The feedstock can further include up to about 30 wt-% aromatics. In certain embodiments, the feedstock can contain from about 0 wt-% to about 30 wt-% olefins and/or from about 0 wt-% to about 100 wt-% n-paraffins and/or from about 0 wt-% to about 100 wt-% isoparaffins and/or from about 0 wt-% to about 30 wt-% aromatics. The hydrocarbon feedstock can originate from various sources, for example from natural gas condensates, petroleum distillates, coal tar distillates, peat and/or a renewable source. For example, the hydrocarbon feedstock can include light naphtha, heavy naphtha, straight run naphtha, full range naphtha, hydrotreated naphtha, delayed coker naphtha, hydrocracker naphtha, gas condensates, coker fuel oil and/or gas oils, e.g., light coker gas oil and heavy coker gas oil. For further example, the hydrocarbon feedstock can include a hydrocarbon product from the synthesis of syngas, e.g., from Fischer Tropsch synthesis and/or the gasification of hydrocarbon material.

The hydrocarbon feedstream is (steam) cracked to produce a product stream. For example, the hydrocarbon feedstream can be steam cracked in the radiant section of a steam cracking furnace. The feed stream can be steam cracked where it exits the reactor (tube) outlet at a temperature from about 600° C. to about 1000° C., from about 700° C. to about 900° C., or from about 750° C. to about 850° C.

The product stream can include the (steam) cracking products. For example, the product stream can include various alkenes, e.g., light olefins, such as ethylene. The product stream can further include other olefins, e.g., propylene and butene, paraffins, e.g., methane, ethane, propane, and butane, dienes, e.g., butadiene, and/or alkynes, e.g., acetylene, methylacetylene and vinylacetylene. In certain embodiments, the product stream can further include other components, for example, hydrogen, carbon monoxide, carbon dioxide, hydrogen sulfide, benzene, toluene, xylenes, ethylbenzene, styrene, pyrolysis gasoline, and/or pyrolysis fuel oil.

Figure 2:
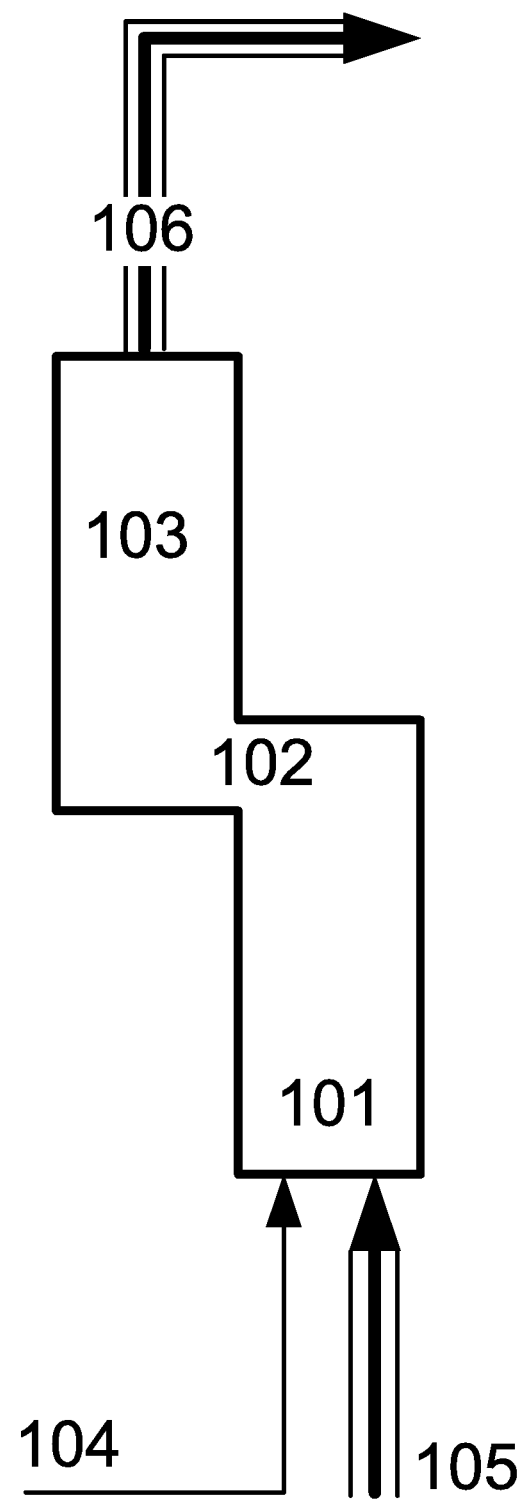
FIG. 2 shows a schematic representation of an example of a system comprising a furnace to which fuel is fed together with non-heated combustion air.
Figure 3:
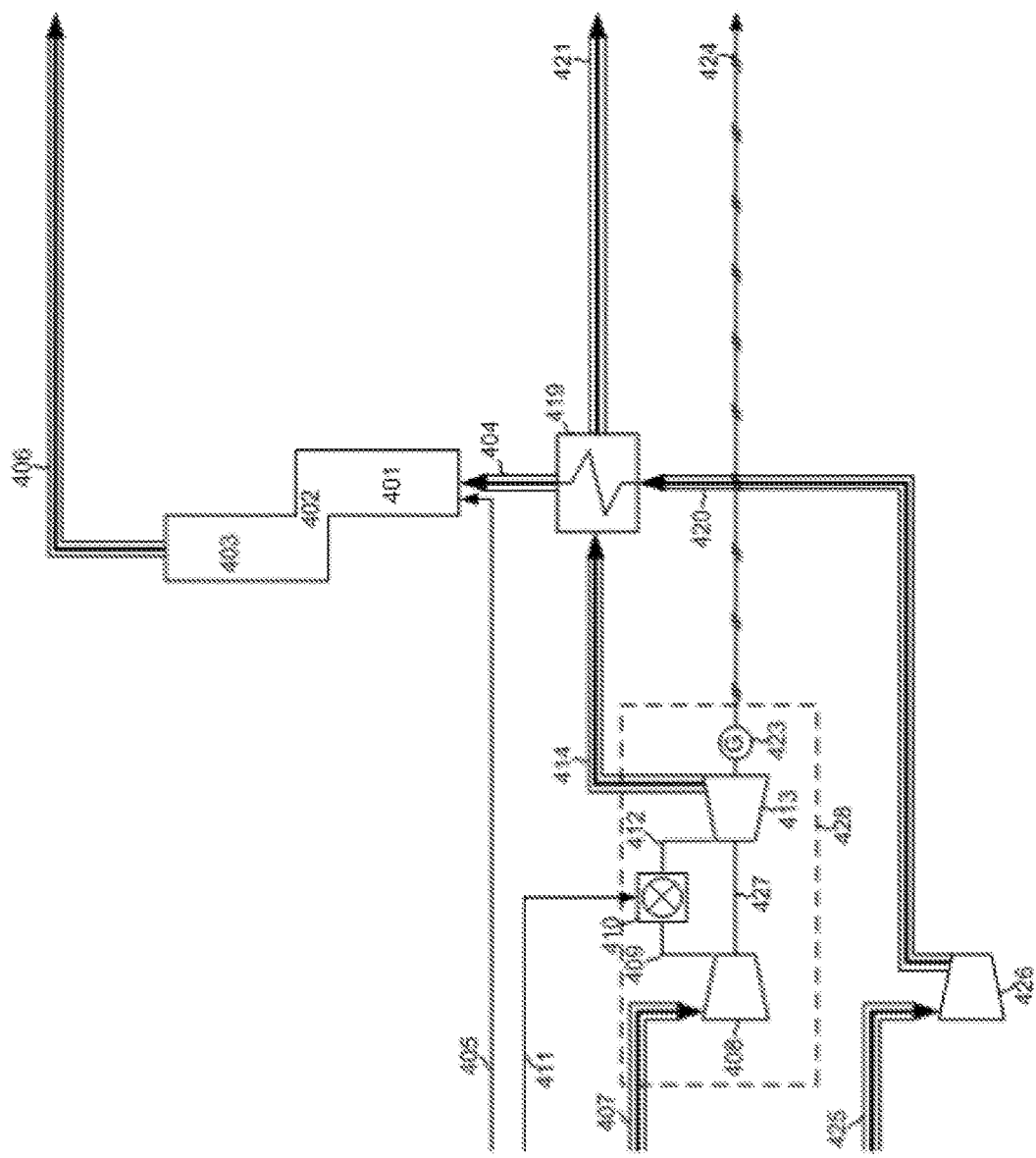
FIG. 3 shows a schematic representation of an example of a system comprising a furnace to which fuel is fed together with pre-heated combustion air.
Figure 4:
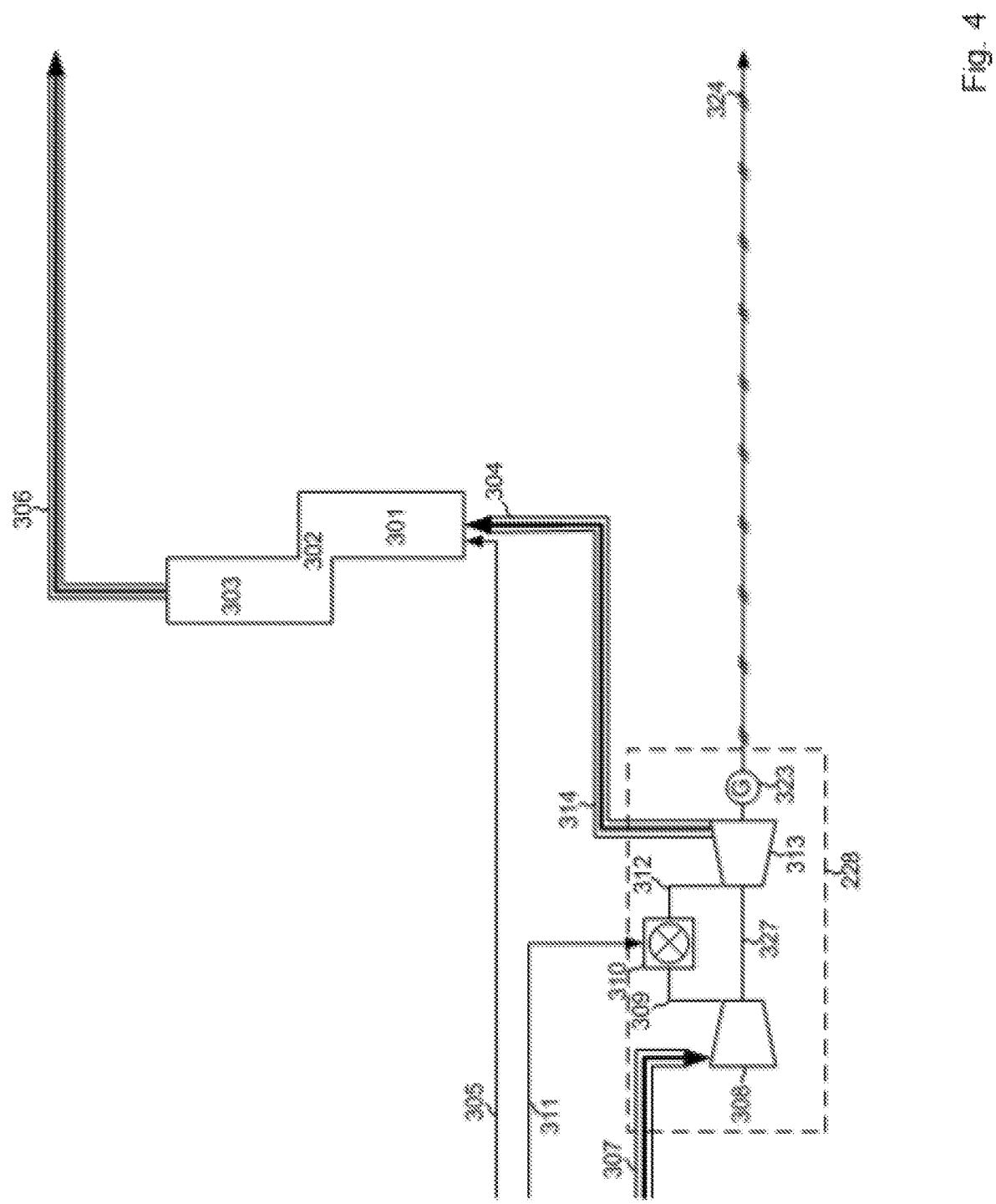
FIG. 4 shows a schematic representation of an example of a system comprising a furnace to which fuel is fed together with pre-heated combustion air.

The invention is further explained in detail referring to FIGS. in which:

FIG. 1 shows heat release plots of a flue gas in a furnace corresponding to embodiments of FIGS. 2, 3 and 4. In all cases the furnace has a similar heat requirement (154 $MW_{th}$) in the radiation section.

FIG. 2 shows a schematic representation of an example of a system comprising a furnace to which fuel is fed together with non-heated combustion air. The furnace is fed with fuel (104) and ambient air (105). The fuel (104) is pure methane. The ambient air has a temperature of 32° C. and has an oxygen content of 21%$_{vol}$. Fuel (104) is combusted with ambient air (105). If the heat of combustion would not immediately radiate away, it would reach the temperature of the adiabatic flame temperature in position 101 where it will give off heat (154 MW) in the radiation section. The flue gasses leave the radiation section at a temperature of 1200° C. (102) and additional heat is recovered in the convection section (103). The flue gas leaves this section with a temperature of 120° C. (106). The content of oxygen in the flue gas is 2% mol.

The corresponding heat and material balance is provided by Table 1 and is used for making the plot of FIG. 1. The line with a medium level of slope (triangular marker) in FIG. 1 corresponds to this example. The temperature at the beginning of the radiation section is 1850° C. and the heat release at the convection section is 379 $MW_{th}$.

TABLE 1

| Stream no | | 101 | 102 | 104 | 105 | 106 |
|---|---|---|---|---|---|---|
| Pressure | $bar_a$ | 1 | 1 | 1 | 1 | 1 |
| Temperature | ° C. | 1850 | 1200 | 32 | 32 | 120 |
| Mass Flow | kg/h | 581 | 581 | 553 | 28 | 581 |
| Volume Flow | m³/h | 3685 | 2557 | 485 | 22 | 682 |
| Mass Enthalpy | kJ/kg | −534 | −1488 | −324 | −4632 | −2881 |
| | | Component Mole Fraction | | | | |
| CO2 | —/— | 0.084 | 0.084 | 0.000 | 0.000 | 0.084 |
| H2O | —/— | 0.203 | 0.203 | 0.039 | 0.000 | 0.203 |
| O2 | —/— | 0.020 | 0.020 | 0.205 | 0.000 | 0.020 |
| N2 | —/— | 0.685 | 0.685 | 0.747 | 0.000 | 0.685 |
| AR | —/— | 0.008 | 0.008 | 0.009 | 0.000 | 0.008 |
| CH4 | —/— | 0.000 | 0.000 | 0.000 | 1.000 | 0.000 |
| H2 | —/— | 0.000 | 0.000 | 0.000 | 0.000 | 0.000 |

Note that the temperature at 101 does not occur in reality, but this is the so called adiabatic flame temperature FIG. 3 shows a schematic representation of an example of a system comprising a furnace to which fuel is fed together with pre-heated combustion air. In this example, the combustion air (404) is ambient air which is heated by a flue gas (414) from a gas turbine (428). The combustion air (404) to be fed to the furnace has a higher temperature than the combustion air in the example of FIG. 2, and its oxygen content is the same.

In this example, ambient air (407) is compressed in a compressor (408) to pressurized air (409) and further heated in a combustion chamber (410) where a fuel (411) is combusted resulting in a hot, pressurized flue gas (412) that is expanded to deliver work in a turbo expander (413). The work from the turbo expander is used to drive compressor (408) and a generator (423) that are mechanically coupled on the same axis (427). The above arrangement of components is typically provided in one packaged unit that is called a Gas Turbine Generator (package) (428) that produces hot turbine exhaust (414) and electricity (424). The hot exhaust (414) from turbo expander (413) is cooled down in heat exchanger (419) and exits this device as stream 421. The released heat is used to preheat air (420) that is used as preheated combustion air (404) to the cracking furnace. The air (404) is mixed with fuel (405) and combusted in a burner to provide heat to radiation section (401) of the steam cracking furnace. Since heat exchanger (419) causes some pressure drop from (420) to (404), air compressor (426) is used to overcome this pressure drop by raising the pressure of ambient air (425) sufficiently.

The corresponding heat and material balance is provided by Table 2 and is used for making the plot of FIG. 1. The line with the steepest slope (X-makers) corresponds to this example.

Note that the temperature at 401 does not occur in reality, but this is the so called adiabatic flame temperature Because of the high temperature of the combustion air fed to the furnace, this solution achieves high fuel savings, but higher flame temperatures as well. Higher flame temperatures result in more NOx formation. Although not occurring in reality, the adiabatic flame temperature is a relatively easy to calculate indicator. In this case it is (401) 2158° C., while in the base case it was (101) 1850° C. The heat release at the convection section is lower than the example of FIG. 2, and is 305 $MW_{th}$. In case this method of combustion air preheat is considered as a revamp option, there may be much less heat available possibly resulting in too low steam temperatures, too little evaporation of the feedstock or a too low preheat temperature before the mixed feed is fed to the reactor tube.

FIG. 4 shows a schematic representation of an example of a system comprising a furnace to which fuel is fed together with pre-heated combustion air. In this example, the combustion air is a flue gas from a gas turbine. The combustion air to be fed to the furnace has a higher temperature than the combustion air in the example of FIGS. 2 and 3, but its oxygen content is lower (13.3%$_{vol}$). Some fresh ambient air can be mixed with this (not drawn) to increase the oxygen content of stream 304.

The corresponding heat and material balance is provided by Table 3 and is used for making the plot of FIG. 1. The line with the least steep slope in FIG. 1 (square-marker corresponds to this example.

TABLE 2

| Stream no | | 401 | 402 | 404 | 405 | 406 | 407 | 409 |
|---|---|---|---|---|---|---|---|---|
| Pressure | bar$_a$ | 1 | 1 | 1 | 30 | 1 | 1 | 20 |
| Temperature | ° C. | 2158 | 1200 | 495 | 32 | 120 | 32 | 458 |
| Mass Flow | kg/h | 391 | 391 | 372 | 19 | 391 | 365 | 365 |
| Volume Flow | m³/h | 2837 | 1719 | 821 | 1 | 458 | 320 | 39 |
| Mass Enthalpy | kJ/kg | −68 | −1488 | 169 | −4662 | −2881 | −324 | 128 |
| Component Mole Fraction | | | | | | | | |
| CO2 | —/— | 0.084 | 0.084 | 0.000 | 0.000 | 0.084 | 0.000 | 0.000 |
| H2O | —/— | 0.203 | 0.203 | 0.039 | 0.000 | 0.203 | 0.039 | 0.039 |
| O2 | —/— | 0.020 | 0.020 | 0.205 | 0.000 | 0.020 | 0.205 | 0.205 |
| N2 | —/— | 0.685 | 0.685 | 0.747 | 0.000 | 0.685 | 0.747 | 0.747 |
| AR | —/— | 0.008 | 0.008 | 0.009 | 0.000 | 0.008 | 0.009 | 0.009 |
| CH4 | —/— | 0.000 | 0.000 | 0.000 | 1.000 | 0.000 | 0.000 | 0.000 |
| H2 | —/— | 0.000 | 0.000 | 0.000 | 0.000 | 0.000 | 0.000 | 0.000 |

| Stream no | | 411 | 412 | 414 | 420 | 421 | 422 |
|---|---|---|---|---|---|---|---|
| Pressure | bar$_a$ | 30 | 20 | 1 | 1 | 1 | 1 |
| Temperature | ° C. | 32 | 1180 | 558 | 32 | 120 | 495 |
| Mass Flow | kg/h | 7 | 372 | 372 | 372 | 372 | 372 |
| Volume Flow | m³/h | 0 | 80 | 761 | 326 | 360 | 821 |
| Mass Enthalpy | kJ/kg | −4662 | 39 | −741 | −324 | −1233 | 169 |
| Component Mole Fraction | | | | | | | |
| CO2 | —/— | 0.000 | 0.032 | 0.032 | 0.000 | 0.032 | 0.000 |
| H2O | —/— | 0.000 | 0.103 | 0.103 | 0.039 | 0.103 | 0.039 |
| O2 | —/— | 0.000 | 0.133 | 0.133 | 0.205 | 0.133 | 0.205 |
| N2 | —/— | 0.000 | 0.723 | 0.723 | 0.747 | 0.723 | 0.747 |
| AR | —/— | 0.000 | 0.009 | 0.009 | 0.009 | 0.009 | 0.009 |
| CH4 | —/— | 1.000 | 0.000 | 0.000 | 0.000 | 0.000 | 0.000 |
| H2 | —/— | 0.000 | 0.000 | 0.000 | 0.000 | 0.000 | 0.000 |

TABLE 3

Heat and Material Balance for FIG. 4

| Stream no | | 301 | 302 | 304 | 305 | 306 | 307 | 309 | 311 | 312 | 314 |
|---|---|---|---|---|---|---|---|---|---|---|---|
| Pressure | bar$_a$ | 1 | 1 | 1 | 30 | 1 | 1 | 20 | 30 | 20 | 1 |
| Temperature | °C. | 1629 | 1200 | 558 | 32 | 120 | 32 | 458 | 32 | 1180 | 558 |
| Mass Flow | kg/h | 888 | 888 | 861 | 28 | 888 | 845 | 845 | 16 | 861 | 861 |
| Volume Flow | m³/h | 5046 | 3907 | 2088 | 1 | 1042 | 741 | 90 | 1 | 186 | 1762 |
| Mass Enthalpy | kJ/kg | −862 | −1486 | −740 | −4662 | −2679 | −324 | 128 | −4662 | 39 | −741 |
| Component Mole Fraction | | | | | | | | | | | |
| CO2 | —/— | 0.084 | 0.064 | 0.032 | 0.000 | 0.084 | 0.000 | 0.000 | 0.000 | 0.032 | 0.032 |
| H2O | —/— | 0.203 | 0.203 | 0.103 | 0.000 | 0.203 | 0.039 | 0.039 | 0.000 | 0.103 | 0.103 |
| O2 | —/— | 0.020 | 0.020 | 0.133 | 0.000 | 0.020 | 0.205 | 0.205 | 0.000 | 0.133 | 0.133 |
| N2 | —/— | 0.685 | 0.685 | 0.723 | 0.000 | 0.685 | 0.747 | 0.747 | 0.000 | 0.723 | 0.723 |
| AR | —/— | 0.008 | 0.008 | 0.009 | 0.000 | 0.008 | 0.009 | 0.009 | 0.000 | 0.009 | 0.009 |
| CH4 | —/— | 0.000 | 0.000 | 0.000 | 1.000 | 0.000 | 0.000 | 0.000 | 1.000 | 0.000 | 0.000 |
| H2 | —/— | 0.000 | 0.000 | 0.000 | 0.000 | 0.000 | 0.000 | 0.000 | 0.000 | 0.000 | 0.000 |

Note that the temperature at 301 does not occur in reality, but this is the so called adiabatic flame temperature The main disadvantage of this system is that it saves little fuel on the burners. Because of the lower oxygen content of the combustion air fed to the furnace, the adiabatic temperature in the radiation section will be lower (1629° C.). The heat release in the radiant section per unit of air is lower. To achieve the same heat release in the radiation section, a greater flue gas flow is required. As a consequence this results in a larger heat release in the convection section of the furnace (498 MWth).

The change in the heat balance of the convection section makes these methods for Gas Turbine integration in a steam cracker complicated to revamp existing furnaces with these technologies.

Figure 5:
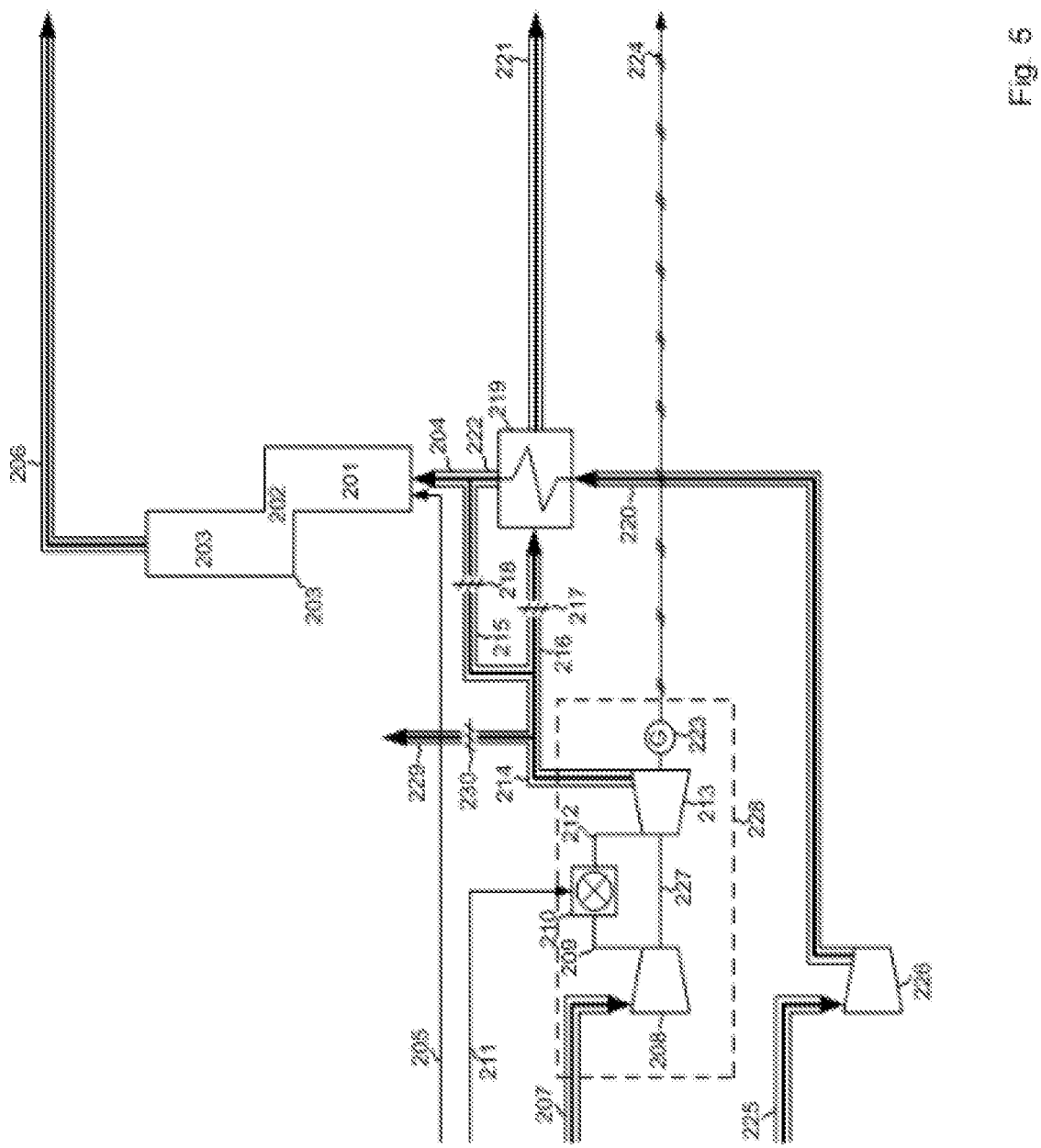
FIG. 5 shows a schematic representation of an example of a system comprising a furnace to which fuel is fed together with pre-heated combustion air according to the invention.

FIG. 5 shows a schematic representation of a system according to the invention. The system includes a gas turbine generator for combusting air and fuel to produce electrical power. The gas turbine generator includes a compressor (208), a combustion chamber (210) and a turbine (turbo expander) (213). The compressor and turbine are operated on a single shaft (227).

Ambient air (207) is compressed in the compressor (208) to pressurized air (209) and further heated in the combustion chamber (210) where a fuel (211) is combusted resulting in a hot, pressurized flue gas (212) that is expanded to deliver work in a turbo expander (213). The work from the turbo expander is used to drive a compressor (208) and a generator (223) that are mechanically coupled on the same axis (227). The above arrangement of components is typically provided in a packaged unit that is called a Gas Turbine Generator (package) (228) that produces hot turbine exhaust (214) (=flue gas (212)) and electricity (224). The flue gas (214) is a mixture of combustion products and excess air from a combustion reaction occurring in a gas turbine (228). The hot flue gas (214) from turbo expander (213) is split into stream 215 and stream 216. In this embodiment, the system comprises a bypass stack for drawing a part (229) of the flue gas (214) before splitting the flue gas (214) into the first portion (215) and the second portion (216). Stream 216 is sent to a heat exchanger (219) that transfers heat from the hot flue gas (216) to fresh air (220) that leaves this exchanger at elevated temperature (222). Stream 215 is the fraction of gas turbine exhaust that was bypassed and is mixed with stream 222 to a mixed preheated combustion air mixture (204). Since heat exchanger (219) causes some pressure drop from 220 to 204, air compressor (226) is used to overcome this pressure drop by raising the pressure of ambient air (225) sufficiently.

When the ratio between stream 215 and stream 216 for a certain gas turbine operating point, ambient air conditions, heat exchanger (219) design, etc. is controlled at the desired combination of temperature and oxygen content of stream 204, the cracking heater can be operated exactly the same as is the case without gas turbine integration (e.g. FIG. 2), but with lower fuel consumption by the burners.

The hot flue gasses that result from the combustion of the mixture of stream 204 and 205 provide the heat for the steam cracking reaction taking place in reactor tubes in the cracking furnace. By doing so, these gases cool and leave the radiation section at position 202, where the so called bridge wall temperature can be measured and the flue gasses flow to the convection section where heat recovery from these gases takes place. This is typically accomplished by preheating the hydrocarbon and steam reactor feed as well as preheating boiler feed water and superheating very high pressure steam, but other means of heat recovery are possible as well. The corresponding heat and material balance is provided by Table 4.

TABLE 4

| Stream no | | 201 | 202 | 204 | 205 | 206 | 207 | 209 | 211 |
|---|---|---|---|---|---|---|---|---|---|
| Pressure | bar$_a$ | 1 | 1 | 1 | 30 | 1 | 1 | 20 | 30 |
| Temperature | °C. | 1849 | 1200 | 533 | 32 | 120 | 32 | 458 | 32 |
| Msss Flow | kg/h | 582 | 582 | 560 | 22 | 582 | 550 | 550 | 19 |
| Volume Flow | m³/h | 3888 | 2560 | 1309 | 1 | 682 | 482 | 59 | 1 |
| Mass Enthalpy | kJ/kg | −534 | −1486 | −369 | −4882 | −2879 | −324 | 128 | −4662 |
| Component Mole Fraction | | | | | | | | | |
| CO2 | —/— | 0.084 | 0.084 | 0.019 | 0.000 | 0.054 | 0.000 | 0.000 | 0.000 |
| H2O | —/— | 0.203 | 0.203 | 0.077 | 0.000 | 0.203 | 0.039 | 0.039 | 0.000 |
| O2 | —/— | 0.020 | 0.020 | 0.162 | 0.000 | 0.020 | 0.205 | 0.205 | 0.000 |
| N2 | —/— | 0.685 | 0.685 | 0.733 | 0.000 | 0.685 | 0.747 | 0.747 | 0.000 |

TABLE 4-continued

| | | | | | | | | |
|---|---|---|---|---|---|---|---|---|
| AR | —/— | 0.008 | 0.008 | 0.009 | 0.000 | 0.008 | 0.009 | 0.009 | 0.000 |
| CH4 | —/— | 0.000 | 0.000 | 0.000 | 1.000 | 0.000 | 0.000 | 0.000 | 1.000 |
| H2 | —/— | 0.000 | 0.000 | 0.000 | 0.000 | 0.000 | 0.000 | 0.000 | 0.000 |

| Stream no | | 212 | 214 | 215 | 216 | 220 | 221 | 222 |
|---|---|---|---|---|---|---|---|---|
| Pressure | bar$_a$ | 20 | 1 | 1 | 1 | 1 | 1 | 1 |
| Temperature | °C. | 1180 | 558 | 558 | 558 | 32 | 120 | 495 |
| Msss Flow | kg/h | 560 | 560 | 331 | 229 | 229 | 229 | 229 |
| Volume Flow | m$^3$/h | 121 | 1146 | 678 | 468 | 200 | 221 | 505 |
| Mass Enthalpy | kJ/kg | 39 | −741 | −741 | −741 | −324 | −1233 | 169 |
| Component Mole Fraction | | | | | | | | |
| CO2 | —/— | 0.032 | 0.032 | 0.032 | 0.032 | 0.000 | 0.032 | 0.000 |
| H2O | —/— | 0.103 | 0.103 | 0.103 | 0.103 | 0.039 | 0.103 | 0.039 |
| O2 | —/— | 0.133 | 0.133 | 0.133 | 0.133 | 0.205 | 0.133 | 0.205 |
| N2 | —/— | 0.723 | 0.723 | 0.723 | 0.723 | 0.747 | 0.723 | 0.747 |
| AR | —/— | 0.009 | 0.009 | 0.009 | 0.009 | 0.009 | 0.009 | 0.009 |
| CH4 | —/— | 0.000 | 0.000 | 0.000 | 0.000 | 0.000 | 0.000 | 0.000 |
| H2 | —/— | 0.000 | 0.000 | 0.000 | 0.000 | 0.000 | 0.000 | 0.000 |

From Table 4, it is observed that through bypassing 331/560=59% of the gas turbine flow around heat exchanger 219, the same adiabatic flame temperature of 1849° C. at point 201 is achieved as at point 101 in FIG. 2 (the difference is only 1° C.).

Accordingly, it can be understood that the process according to the invention allows control of the temperature and the oxygen content of the combustion air to be fed to the furnace, which in turn controls the flame temperature in the furnace. This allows optimizing the fuel consumption while limiting the formation of NOx to a reasonable level.

Table 5 further shows that desired adiabatic flame temperature can be obtained by varying the temperature of the turbine exhaust and the ratio between the first flow and the second flow. It can be understood that increasing the bypass flow (215) increases the adiabatic flame temperature.

TABLE 5

| | | Case | | | |
|---|---|---|---|---|---|
| | | 0 | 1 | 2 | 3 |
| Turbine exhaust temperature (214) | °C. | 558 | 770 | 350 | 255 |
| Component Mole Fraction in turbine exhaust (214) | | | | | |
| CO2 | —/— | 0.032 | 0.049 | 0.049 | 0.010 |
| H2O | —/— | 0.103 | 0.134 | 0.134 | 0.059 |
| O2 | —/— | 0.133 | 0.098 | 0.098 | 0.182 |
| N2 | —/— | 0.723 | 0.711 | 0.711 | 0.740 |
| AR | —/— | 0.009 | 0.009 | 0.009 | 0.009 |
| CH4 | —/— | 0.000 | 0.000 | 0.000 | 0.000 |
| H2 | —/— | 0.000 | 0.000 | 0.000 | 0.000 |
| flowratio over 215 | —/— | 0.59 | 0.59 | 0.20 | 0.69 |
| flowratio over 216 | —/— | 0.41 | 0.41 | 0.80 | 0.31 |
| Temperature 222 | °C. | 495 | 733 | 279 | 170 |
| Temperature 204 | °C. | 533 | 756 | 294 | 229 |
| Adiabatic flame temperature (201) | °C. | 1849 | 1852 | 1849 | 1851 |

EXAMPLES

Rigorous simulations are done for a furnace steam cracking 45 t/h of hydrocarbon feedstock at a steam-to-oil ratio of 0.4. The furnace has floor and wall burners, where 80% of the heat input is provided by the floor burners and 20% by the wall burners. Ambient air temperature is 32° C. and 100% relative humidity. The simulations are performed with Pyrotec EFPS version 6 software.

Four cases are modeled:

Case 0—Base case (corresponds to FIG. 2). The furnace is operated without any kind of preheated air in the design configuration at design conditions.

Case 1—The furnace is run with preheated air for the Floor burners only, using the system illustrated in FIG. 3. Gas Turbine exhaust gas is used to preheat ambient air to 495° C.

Case 2—The furnace is run with preheated air for the Floor burners only, using the system illustrated in FIG. 5 (according to the invention). This gas has the composition of stream 204 from table 4 and a temperature of 533° C.

Case 3—The furnace is run with preheated air for the Floor burners and wall burners, using the system illustrated in FIG. 5 (according to the invention). This gas has the composition of stream 204 from table 4 and a temperature of 533° C.

[The furnace has the following elements in the convection section (from top to bottom):

FPH—Feed preheater, heats and partly evaporated the hydrocarbon feedstock.

ECO—Preheats boiler feed water before feeding it to the steam drum.

UMP—Upper Mixed Preheat, heats a mix of hydrocarbon feedstock from FPH and dilution steam.

[SSH1—Superheat steam from the steam drum.

SSH2—further superheats steam originating from SSH1 and quench to desired conditions.

LMP—Lower Mixed Preheat, further heats the mixture from UMP before sending it to the reactor tubes.

Figure 6:
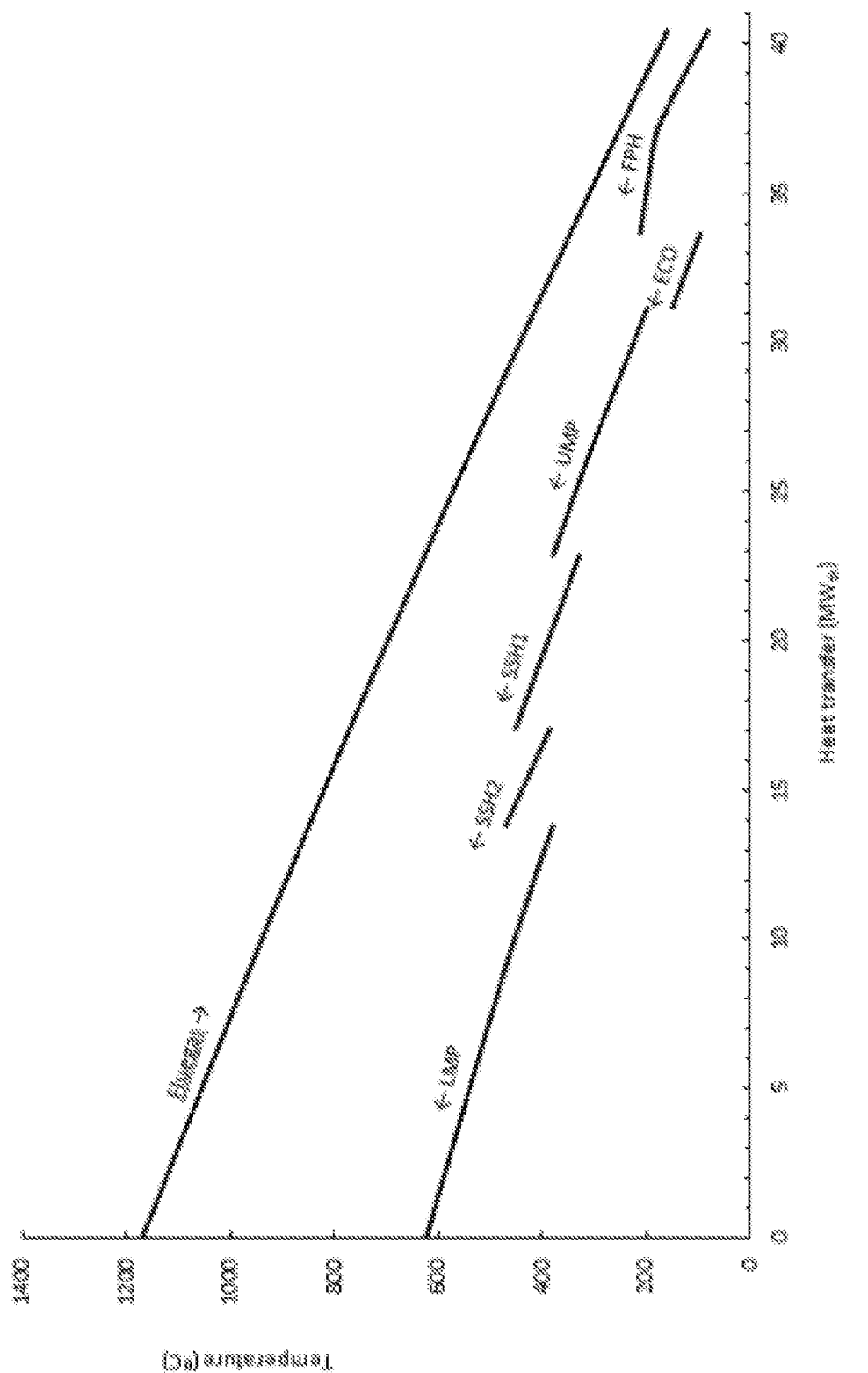
FIGS. 6-9 each show a heat release plot where the temperature is plotted as a function of the transferred heat for all elements of the convection section and the flue gas and FIG. 10 shows the heat absorbed by the Feed Preheater element in the convection section in FIGS. 6-9.
Figure 7:
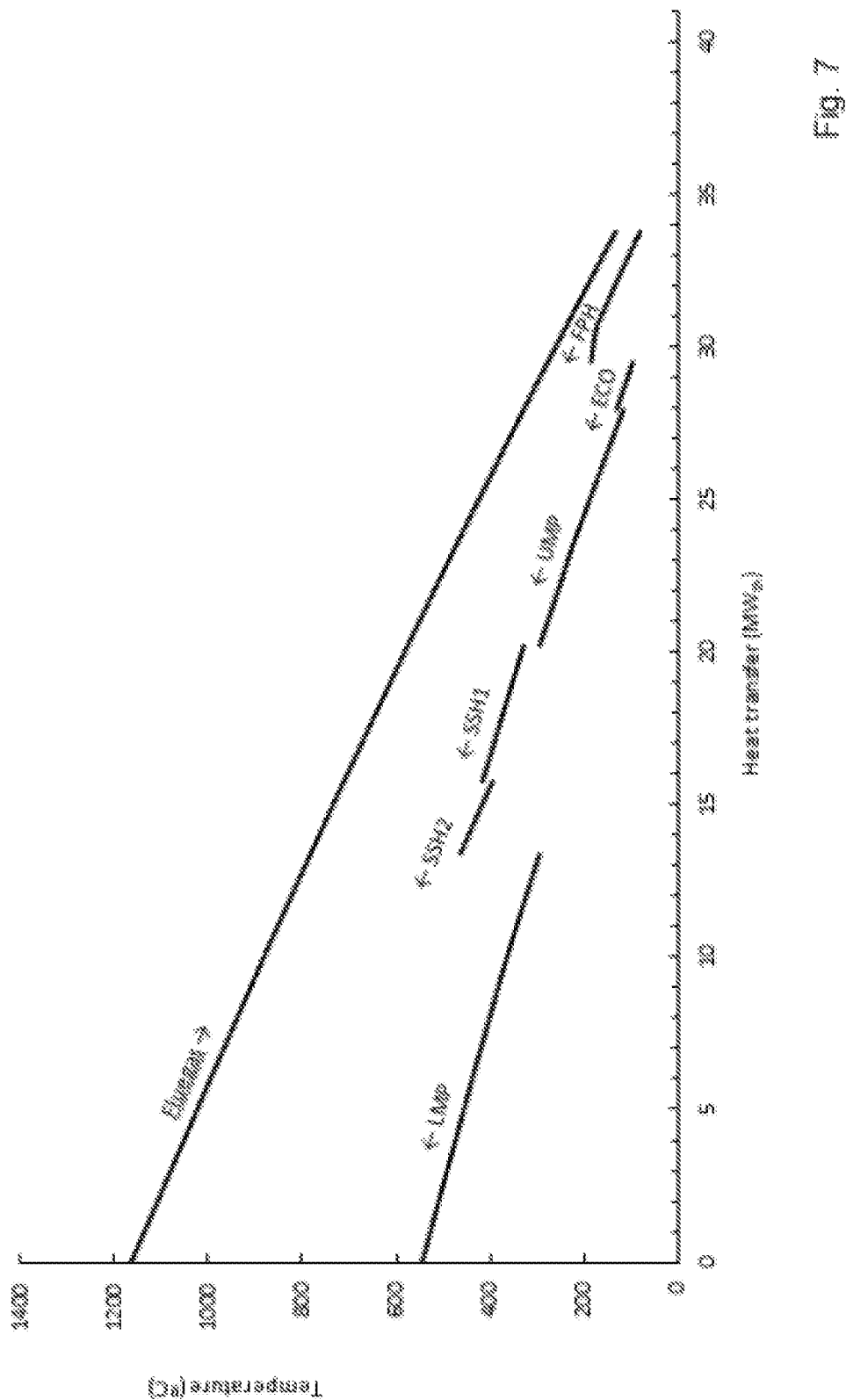
Figure 8:
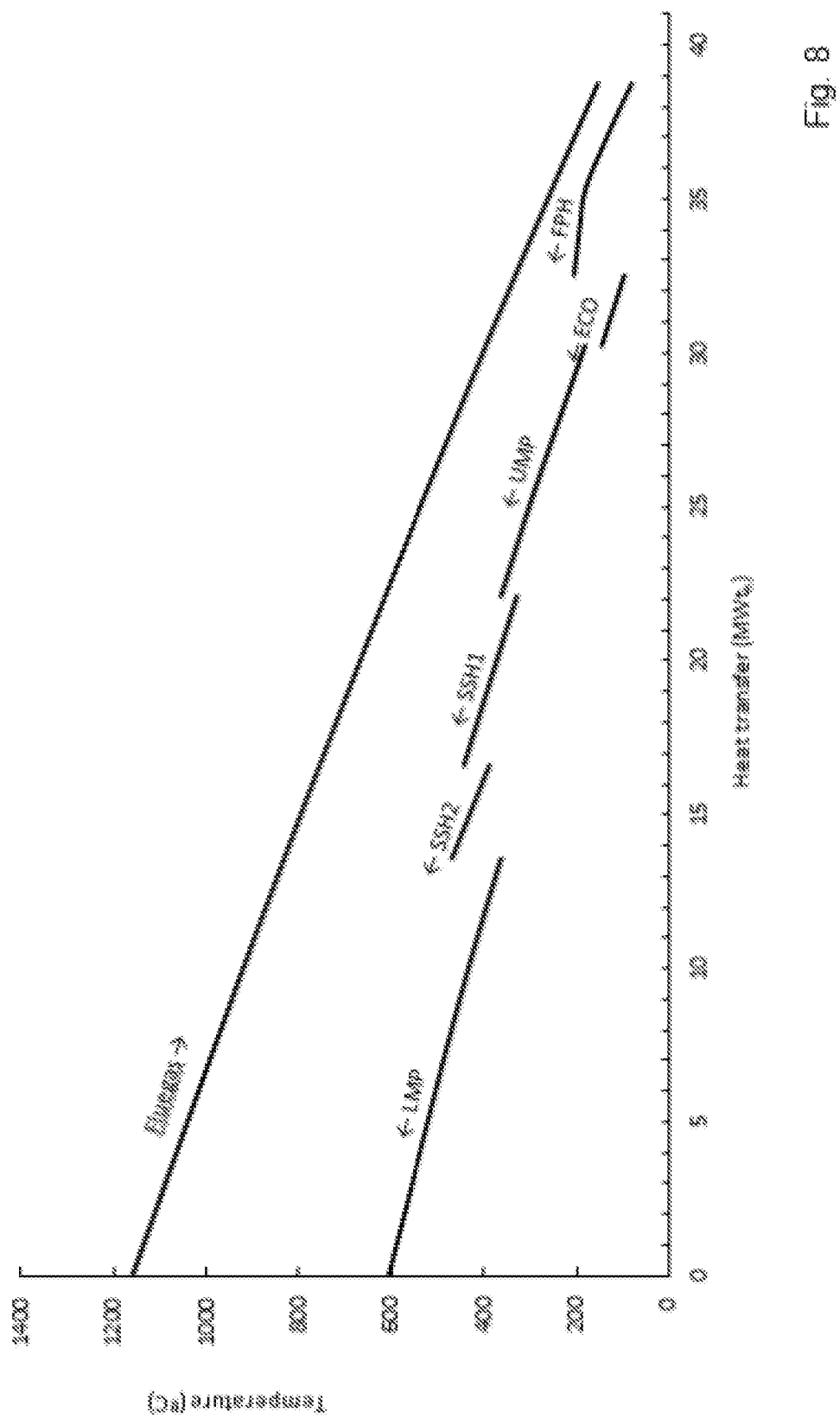
Figure 9:
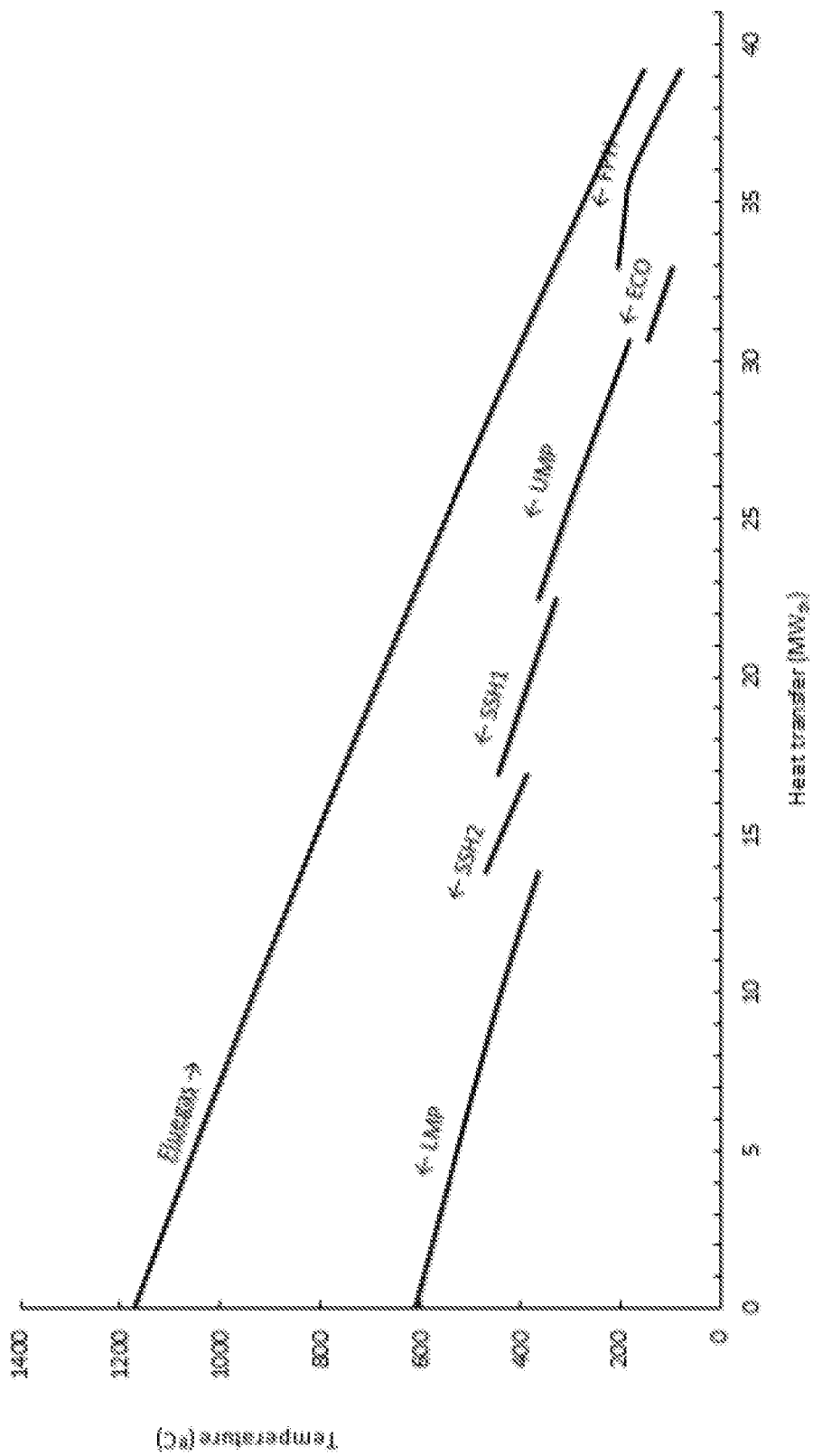

Results for the heat transfer in the convection section for all cases are provided in the form of Heat release plots (QT-diagrams) where the temperature is plotted as a function of the transferred heat for all elements of the convection section and the flue gas By FIG. 6 (case 0), FIG. 7 (case 1), FIG. 8 (case 2), FIG. 9 (case 3).

From the heat release plots/QT diagrams in FIGS. 6 through 9, it is observed that for cases 0, 2 and 3 the heat transfer is all very similar: The total duty is 39-40 MW$_{th}$ and the exit of the LMP is slightly above 600° C. For case 1 however the duty is far less (36 MW$_{th}$) and the exit of the LMP is well below 600° C.

The duties for the elements in the convection section are summarized by Table 6. From table 6, it is observed that the elements higher up in the convection section (FPH, ECO and UMP) suffer significantly from the operating mode in case 1. This applies in particular for the FPH, where (6.8–4.3)/ 6.8*100%=37% less heat is added to the feedstock, compared to cases 3 and 4 according to the invention.

TABLE 6

Calculated thermal duties for the elements in the convection section ($MW_{th}$)

|  | FPH | ECO | UMP | SSH1 | SSH2 | LMP | Total |
|---|---|---|---|---|---|---|---|
| case 0 | 6.8 | 2.5 | 8.3 | 5.8 | 3.2 | 13.8 | 40.4 |
| case 1 | 4.3 | 1.6 | 7.7 | 4.5 | 2.4 | 13.4 | 33.8 |
| case 2 | 6.2 | 2.3 | 8.1 | 5.5 | 3.0 | 13.6 | 38.7 |
| case 3 | 6.2 | 2.3 | 8.2 | 5.6 | 3.1 | 13.8 | 39.2 |

Further results for the radiation section of the furnace are provided by Table 7.

TABLE 7

Results for the operation of the radiation section of the furnace

|  |  | Case 0 | Case 1 | Case 2 | Case 3 |
|---|---|---|---|---|---|
| Fired Heat (LHV) | $MW_{th}$ | 77.4 | 63.6 | 63.0 | 60.5 |
| Released heat (LHV + Sensible heat) | $MW_{th}$ | 77.6 | 73.4 | 76.5 | 76.6 |
| Absorbed heat Radiation section | $MW_{th}$ | 31.2 | 35.5 | 32.2 | 31.9 |
| Absorbed Heat Convection section | $MW_{th}$ | 40.4 | 33.8 | 38.7 | 39.2 |
| Maximum radiating gas T | °C. | 1348 | 1425 | 1367 | 1358 |
| Maximum Tube Metal Temperature | °C. | 980 | 1007 | 987 | 983 |
| Oxygen content in flue gas | $\%_{vol}$ dry | 2.1 | 2.1 | 1.8 | 1.7 |

From Table 7, it is observed that case 3 had the largest reduction in fired heat (thus the biggest energy savings potential), while case 2 and case 3 have very similar operation in the radiation section compared to case 0 (base case).

Case 1 reports a higher maximum radiating gas temperature, resulting in higher NOx formation and a higher Tube Metal Temperature (TMT) of the reactor coils at the start of the run. During operation the TMT will increase as a result of coke formation in the reactor tubes. When the TMT reaches to high temperatures, the furnace needs to be decreased in thermal power or decoked. In case 1 this will occur earlier than for case 2 and case 3. Cases 2 and 3 are likely to achieve similar run lengths as compared to the base case 0.

Figure 10:
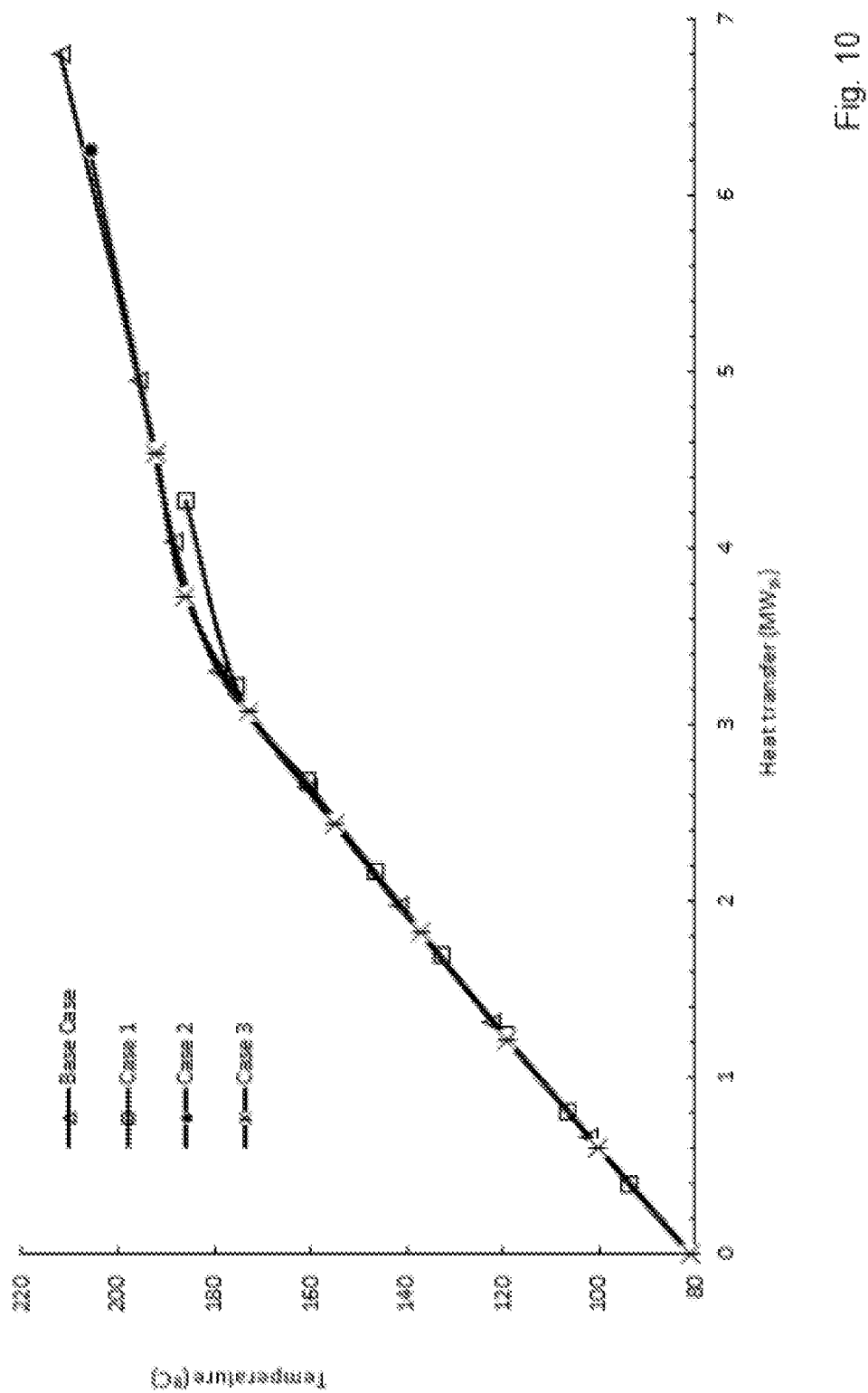

Another advantage of the process according to the invention is that the heat balance over the convection section can be influenced by changing the ratio of bypass over heat exchanger 219. The heat absorbed by the FPH is plotted in FIG. 10. From this figure, it is observed that the observed duty by the FPH is different between case 1 and case 2. However, by adjusting the bypass around heat exchanger 219, any operating point between case 3 and case 1 can be achieved. This is useful in that the desired temperatures and evaporating rates can still be achieved for different types of feedstocks.

Figure 11:
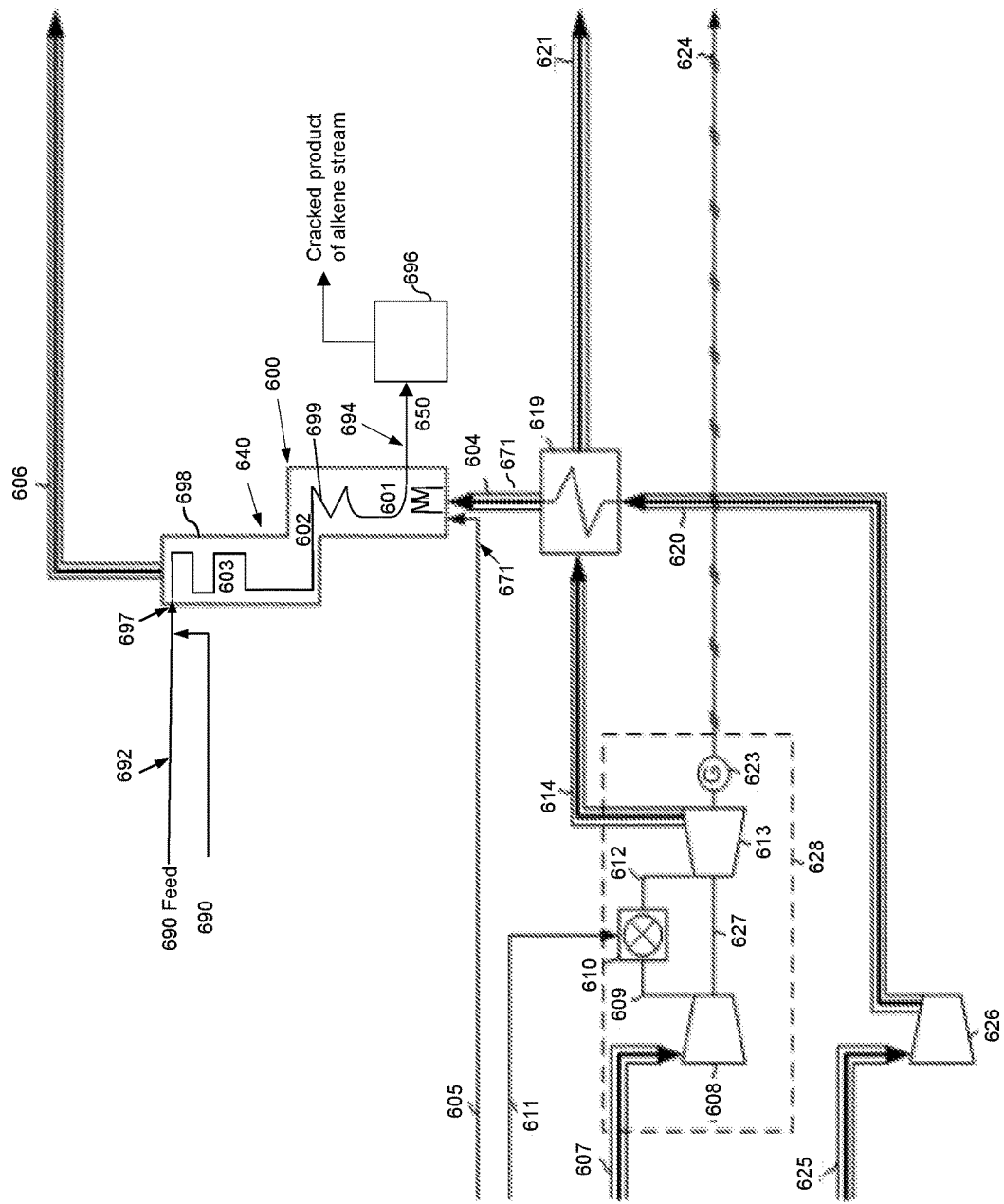
FIG. 11 shows a schematic representation of an example of a system according to the present invention comprising a steam cracker having a furnace to which fuel is fed together with pre-heated combustion air.

FIG. 11 shows a schematic representation of an example of a system having a steam cracking unit (600) to which fuel (605) is fed together with pre-heated combustion air (604). "Steam cracking" and steam cracker is a petrochemical process in which saturated hydrocarbons are broken down into smaller hydrocarbons, especially to alkenes such as ethylene and propylene. In steam cracking hydrocarbon a hydrocarbon feed 690, e.g., gas oil, naphtha, liquid petroleum gas (LPG) or ethane is diluted with steam (680) and briefly heated in a furnace 640 of steam cracking unit (600) without the presence of oxygen. Typically, the cracking reaction temperature is between 750° C. and 950° C., more preferably from 800° C. to 900° C. Residence times may be one second or less, or even milliseconds. After the cracking temperature has been reached, the gas is usually quickly quenched to stop the reaction in a transfer line heat exchanger or inside a quenching header using quench oil. The products produced in the reaction depend on the composition of the feed, the hydrocarbon to steam ratio and on the cracking temperature and furnace residence time. Light hydrocarbon feeds such as ethane, LPGs or light naphtha give product streams rich in the lighter polymer grade olefins, including ethylene, propylene, and butadiene. Heavier hydrocarbon (full range and heavy naphtha and gas oil fractions) also give products rich in aromatic hydrocarbons. In this example, the combustion air (604) is ambient air which is heated by a flue gas (614) from a gas turbine (628). The combustion air (604) to be fed to furnace has a higher temperature than the combustion air in the example of FIG. 2, and its oxygen content is the same.

In this embodiment, ambient air (607) is compressed in a compressor (608) to pressurized air (609) and further heated in a combustion chamber (610) where a fuel (611) is combusted resulting in a hot, pressurized flue gas (612) that is expanded to deliver work in a turbo expander (613). The work from the turbo expander is used to drive compressor (608) and a generator (623) that are mechanically coupled on the same axis (627). The above arrangement of components is typically provided in one packaged unit that is called a Gas Turbine Generator (package) (628) that produces hot turbine exhaust (614) and electricity (624). The hot exhaust (614) from turbo expander (613) is cooled down in heat exchanger (619) and exits this device as stream (621). The released heat is used to preheat air (620) that is used as preheated combustion air (604) to the steam cracking furnace, which includes a radiant section (601), a convection section (602). The preheated combustion air (604) is mixed with fuel (605) and combusted in a burner (650) in radiant section (601) of the furnace (640) of steam cracking unit (600) to provide heat to radiation section (601) of the steam cracker furnace 640. Furnace (640) also includes a convection section (603), the feedstock (690) to be cracked enters the convection section (603) of the furnace of the steam cracker is mixed with steam (680). This mixture may be preheated using high pressure steam (675) before entering the radiant section. The radiant section has several burners which raise the temperature of the feed to about 750-850° C. ensuring a high enough temperature for cracking to occur. After exiting the furnace of the steam cracker, the cracked gases are optionally cooled to prevent further reactions from occurring. As noted above, furnace 640 defines both convection section (603) and radiant zone (601), and, respectively within such zones are convection coils as tubes (698) and radiant coils as tubes (699).

A hydrocarbon feedstock or a mixture of steam and such hydrocarbon feedstock is conducted to inlet (697) of convection tubes (698) via conduit (692) which is in fluid flow communication with convection tubes (698). Feed (690) passes through tubes (698) of cracking furnace (640)

wherein it is heated to a cracking temperature in order to induce cracking of the feed. The cracked product stream from cracking furnace (692) passes downstream through conduit 694 to separator (696) which separates the cracked product stream into an alkene containing-stream and other streams.

Typical pressures within the cracking zone will generally be in the range of from about 0 psig to about 100 psig and, preferably from 1 psig to 60 psig.

Since heat exchanger (619) causes some pressure drop from (620) to (604), air compressor (626) is used to overcome this pressure drop by raising the pressure of ambient air (625) sufficiently.

The invention claimed is:

1. A process for cracking a hydrocarbon stream, said process comprising the following steps:
   (a) combusting fuel in a gas turbine in the presence of compressed air to produce a flue gas, wherein the flue gas drives a turbine to produce electricity in a coupled generator or work to power a coupled rotating equipment,
   (b) feeding a first portion of the flue gas to a heat exchanger,
   (c) feeding ambient air to the heat exchanger to be heated by the first portion of the flue gas to provide heated air,
   (d) feeding a radiant section of a furnace of a steam cracking unit with fuel and a mixture of a second portion of the flue gas and the heated air obtained by step (c), and
   (e) feeding a convective portion of the furnace of the steam cracking unit a hydrocarbon feed stream via convection coils in the convection section of the furnace in the steam cracker.

2. The process of claim 1, wherein the hydrocarbon feed is preheated by the convection section of the furnace, the radiant portion of the furnace, or both.

3. The process of claim 1, wherein the flue gas obtained in step (a) contains from about 5% to about 18 oxygen by volume.

4. The process of claim 1, wherein the flue gas obtained in step (a) has a temperature from about 300° C. to about 800° C.

5. The process of claim 1, wherein the mixture has a temperature of from about 300° C. to about 800° C.

6. A system for steam cracking a hydrocarbon stream to produce alkenes, said system comprising:
   (a) a gas turbine for combusting fuel in the presence of compressed air to produce a flue gas, wherein the flue gas drives a turbine to produce electricity in a coupled generator or work to power a coupled rotating equipment,
   (b) a heat exchanger for being fed with a first portion of the flue gas and with ambient air, wherein the ambient air is heated by the first portion of the flue gas to provide heated air, and
   (c) a steam cracking unit comprising a furnace for cracking the hydrocarbon stream,
   wherein the furnace is fed with fuel and a mixture of a second portion of the flue gas and the heated air, and
   wherein said furnace comprises a radiant section and a convection section.

7. The system of claim 6, wherein the air to be fed to the heat exchanger is increased in pressure before being fed to the heat exchanger.

8. The system of claim 6, wherein the system further comprises a means for increasing the oxygen content of the flue gas or the second portion of the flue gas.

9. The system of claim 6, wherein the heat exchanger has a further function of at least one of feed preheating, boiler feed water preheating and steam superheating.

10. The system of claim 6, wherein the system further comprises a bypass stack for drawing a part of the flue gas from the gas turbine before splitting the flue gas into the first portion and the second portion.

11. The system of claim 6, wherein the system comprises a plurality of the furnaces, wherein each of the furnaces is fed with fuel and a mixture of a part of the flue gas from the gas turbine and a part of the heated air from the heat exchanger.

12. The system of claim 6, wherein the system comprises a plurality of the furnaces and a corresponding number of the heat exchangers, wherein each of the furnaces is fed with fuel and a mixture of a part of the flue gas from the gas turbine and the heated air from the respective heat exchanger.

* * * * *